(12) United States Patent
Keen et al.

(10) Patent No.: US 10,585,524 B2
(45) Date of Patent: Mar. 10, 2020

(54) INPUT CONTROLS USING PRESSURE SENSORS

(71) Applicant: Apple Inc., Cupertino, CA (US)

(72) Inventors: Bryan D. Keen, San Francisco, CA (US); Nicholas G. Merz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 3 days.

(21) Appl. No.: 16/044,223

(22) Filed: Jul. 24, 2018

(65) Prior Publication Data

US 2019/0102028 A1 Apr. 4, 2019

Related U.S. Application Data

(60) Provisional application No. 62/565,466, filed on Sep. 29, 2017.

(51) Int. Cl.

| | |
|---|---|
| *G06F 3/041* | (2006.01) |
| *H04R 1/08* | (2006.01) |
| *G06F 1/16* | (2006.01) |
| *H04M 1/23* | (2006.01) |
| *H04M 1/02* | (2006.01) |
| *H04R 3/00* | (2006.01) |
| *G06F 3/01* | (2006.01) |
| *H01H 33/32* | (2006.01) |

(52) U.S. Cl.
CPC .......... *G06F 3/0414* (2013.01); *G06F 1/1605* (2013.01); *G06F 1/1626* (2013.01); *G06F 1/1643* (2013.01); *G06F 1/1671* (2013.01); *G06F 1/1688* (2013.01); *G06F 3/016* (2013.01); *G06F 3/0416* (2013.01); *H01H 33/32* (2013.01); *H04M 1/02* (2013.01); *H04M 1/236* (2013.01); *H04R 1/083* (2013.01); *H04R 1/086* (2013.01); *H04R 3/00* (2013.01); *H04M 2250/12* (2013.01); *H04R 2499/11* (2013.01)

(58) Field of Classification Search
CPC .... G06F 3/0414; G06F 3/0416; G06F 1/1605; G06F 1/1643; H04R 1/083
See application file for complete search history.

(56) References Cited

U.S. PATENT DOCUMENTS

| | | | |
|---|---|---|---|
| 8,179,375 B2 * | 5/2012 | Ciesla | G06F 3/0202 |
| | | | 178/18.01 |
| 8,947,383 B2 * | 2/2015 | Ciesla | G06F 3/0202 |
| | | | 345/156 |
| 10,386,960 B1 * | 8/2019 | Smith | G06F 3/04883 |

(Continued)

*Primary Examiner* — Peter D McLoone
(74) *Attorney, Agent, or Firm* — Kilpatrick Townsend & Stockton LLP

(57) ABSTRACT

An input control for controlling various features of an electronic device is described. The input control can be positioned along an exterior surface of the electronic device and cover an opening leading into the electronic device. A pressure sensor can then be positioned within the electronic device and adjacent to the covered opening. The pressure sensor is able to measure a pressure of a volume of air positioned between the pressure sensor and the input control. When movement of the input control changes the pressure of the volume of air, the sensor readings from the pressure sensor can be used to register a user input. The input control can take many forms including rocker buttons, slider switches and input regions.

20 Claims, 12 Drawing Sheets

(56) References Cited

U.S. PATENT DOCUMENTS

| | | | | |
|---|---|---|---|---|
| 2009/0267906 A1* | 10/2009 | Schroderus | ............ | G06F 3/0414 |
| | | | | 345/173 |
| 2010/0103137 A1* | 4/2010 | Ciesla | .................... | G06F 3/0202 |
| | | | | 345/174 |
| 2010/0151916 A1* | 6/2010 | Baek | ................. | H04M 1/72519 |
| | | | | 455/567 |
| 2012/0242607 A1* | 9/2012 | Ciesla | .................... | G06F 3/0202 |
| | | | | 345/173 |
| 2013/0083496 A1* | 4/2013 | Franklin | ............... | G06F 1/1626 |
| | | | | 361/749 |
| 2013/0257817 A1* | 10/2013 | Yliaho | .................. | G06F 3/0414 |
| | | | | 345/177 |
| 2013/0322675 A1* | 12/2013 | Zoellin | .................... | H04R 1/04 |
| | | | | 381/355 |
| 2017/0038880 A1* | 2/2017 | Kinzer | .................. | G06F 1/1684 |
| 2018/0101233 A1* | 4/2018 | Tsukamoto | ............ | G06F 1/1662 |

* cited by examiner

INPUT CONTROLS USING PRESSURE SENSORS

CROSS REFERENCE TO RELATED APPLICATIONS

The present application claims the benefit of and priority to U.S. Provisional Application No. 62/565,466, filed Sep. 29, 2017, the entire contents of which are incorporated herein by reference for all purposes.

FIELD

The described embodiments relate generally to improved user interface designs. In particular, ways of improving the functionality of physical input controls is described.

BACKGROUND

As electronic devices grow increasingly more complex and feature rich, the need for an improved user interface grows commensurately. The user interface of electronic devices often includes a mix of virtual and physical interface objects. A portion of the user interface of the device could be included on a touch sensitive display while another portion of the user interface could be realized by more conventional buttons and/or switches. Unfortunately, conventional push buttons are often limited to providing a small number of different inputs and often are capable of providing only a single type of input. To make matters worse, electronic device manufactures are increasingly moving toward water-resistant robust devices built to withstand relatively harsh environmental buttons, making a large number of conventional buttons, which generally need robust sealing, undesirable. For this reason, ways of adding additional functionality to a button and/or switch is desirable.

SUMMARY

This disclosure describes various embodiments that relate to apparatus for monitoring and characterizing user inputs associated with physical input controls.

A portable electronic device is disclosed and includes: a device housing having a housing wall defining an opening extending therethrough; an input control coupled to an exterior-facing surface of the housing wall and covering a first end of the opening, the input control being configured to receive a user input; and a pressure sensor coupled to an interior-facing surface of the housing wall and covering a second end of the opening such that the input control and pressure sensor cooperatively enclose an interior volume, the pressure sensor being configured to characterize a pressure change within the interior volume resulting from movement of the input control.

A portable electronic device is disclosed and includes the following a device housing having sidewalls that cooperatively define a front opening, one of the sidewalls defining a side opening extending therethrough; a touch screen display assembly disposed within the front opening; an input control positioned at least partially within a recess defined by an exterior-facing surface of the sidewall defining the side opening and covering a first end of the side opening; and a pressure sensor coupled to an interior-facing surface of the sidewall and covering a second end of the side opening such that the input control and pressure sensor cooperatively enclose an interior volume, the pressure sensor being configured to characterize user inputs received by the input control by monitoring pressure changes within the interior volume resulting from movement of the input control.

A portable electronic device is disclosed and includes the following: a device housing comprising a housing wall defining a first opening and a second opening extending therethrough; an input control coupled to an exterior-facing surface of the housing wall and covering a first end of the first opening and a first end of the second opening, the input control being configured to receive a user input; a pressure sensor coupled to an interior-facing surface of the housing wall and covering a second end of the first opening such that the input control and the pressure sensor cooperatively enclose a first interior volume; and a bracket coupled to the interior facing surface and enclosing a second interior volume, the pressure sensor being configured to characterize pressure changes within both the first interior volume and the second interior volume resulting from movement of the input control.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
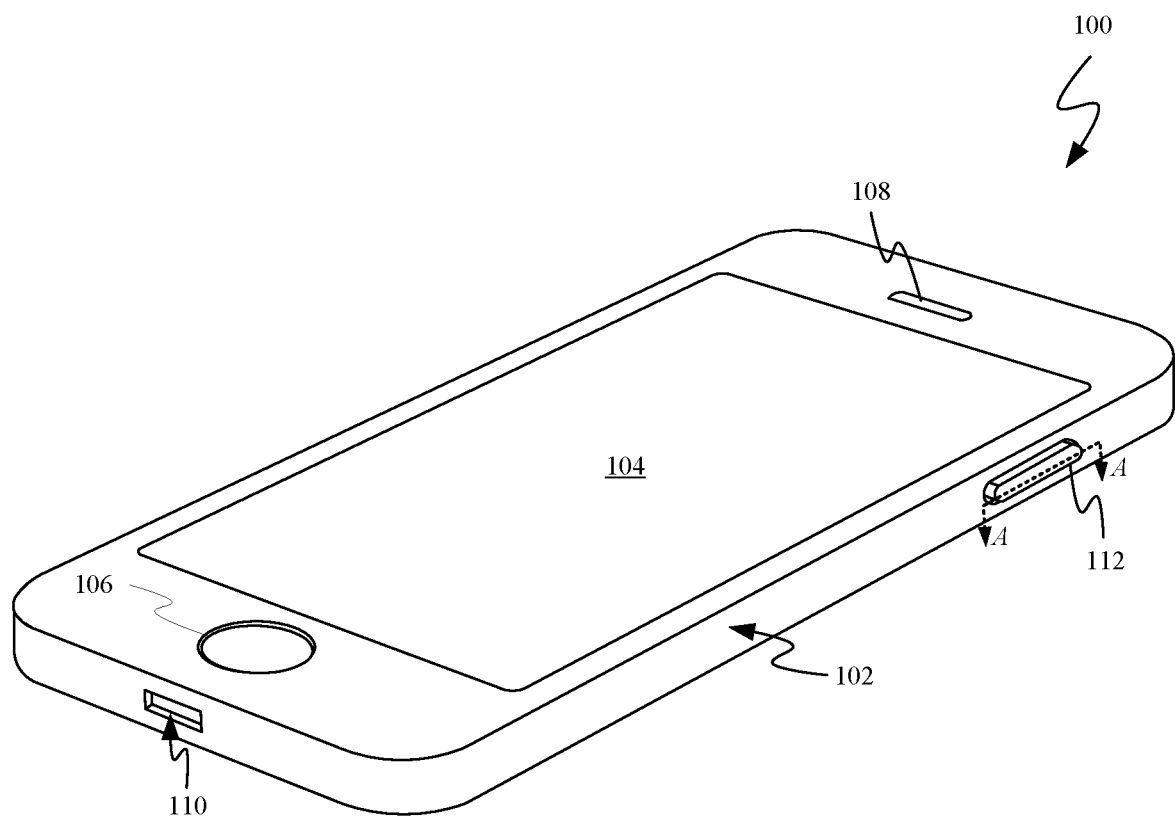
FIG. 1 shows an exemplary portable electronic device suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Portable electronic devices perform ever-increasing numbers of functions to assist users in carrying out tasks in their daily lives. While a touch screen generally provides a majority of the functionality for devices such as smartphones and tablet devices, physical controls distributed at various locations around the portable electronic device generally provide more tactile feedback than virtual controls generated by a touch screen. This tactile feedback can be important for carrying out certain functions such as cycling through applications and turning the device on and off. Unfortunately, physical controls tend to lack the flexibility of virtual controls, thereby limiting their versatility. Furthermore, in some cases, moving parts within a physical control can be more susceptible to wear and tear.

One way to increase the flexibility of physical input controls for a portable electronic device is to use a sensor capable of distinguishing multiple different types and degrees of input. In particular, a button that includes a sealed or quasi-sealed volume can employ a pressure sensor within the sealed volume to characterize user inputs when a size of the sealed volume is changed by the user input. A quasi-sealed volume can be an interior volume within the portable electronic device having small openings to the exterior of the device that are sized to allow pressure equalization to occur only very gradually. In some embodiments, the pressure sensor can also be configured to distinguish different levels of pressure change. A processor in communication with the pressure sensor can be configured to generate different responses based on different levels of detected pressure.

In some embodiments, the pressure sensor can take the form of a microphone. Since microphones are also able to detect and characterize audio waves in addition to measuring pressure, the use of a microphone can further allow for the detection of audio. In some embodiments, the physical input control can include multiple openings through which audio can pass and be detected and characterized by the microphone. In some embodiments, both audio and pressure sensing can be analyzed in order to identify user inputs being made at a physical control.

In order to fully take advantage of the increased number of input types made possible by the use of pressure detection, the physical controls can also include one or more types of haptic feedback components. In this way, control inputs can be verified. For example, the haptic feedback components could be configured to register a hard input with a stronger vibratory response than a soft input, confirming to the user the type of input detected. In this way, any input errors are quickly reported to the user.

These and other embodiments are discussed below with reference to FIGS. 1-8B; however, those skilled in the art will readily appreciate that the detailed description given herein with respect to these figures is for explanatory purposes only and should not be construed as limiting.

FIG. 1 shows an exemplary portable electronic device 100 suitable for use with the described embodiments. Portable electronic device 100 includes device housing 102, which houses numerous electrical components that include electronic display 104. Electronic display 104 can be configured to display media content to a user and receive user inputs from a user in the form of touch inputs across the surface of electronic display 104. The electrical components can also include button 106. In some embodiments, portable electronic device 100 can change operating modes in response to button 106 being actuated. Actuating button 106 in rapid succession can cue additional operating modes of portable electronic device 100. Portable electronic device 100 can also include earpiece speaker 108, which is configured to broadcast audio into the ear of a user proximate earpiece speaker 108. In some embodiments, earpiece speaker 108 can be configured to act as a speaker phone to allow the user to carry on a conversation without holding portable electronic device 100 up to an ear. Portable electronic device 100 also includes I/O port 110, which can be configured to receive and transmit data as well as provide a conduit for charging portable electronic device 100. Side button 112 can take the form of a push button that can be actuated in response to receiving a predetermined amount of force. In some embodiments, portable electronic device 100 can be configured to respond differently to side button 112 being actuated multiple times in quick succession.

Figure 2:
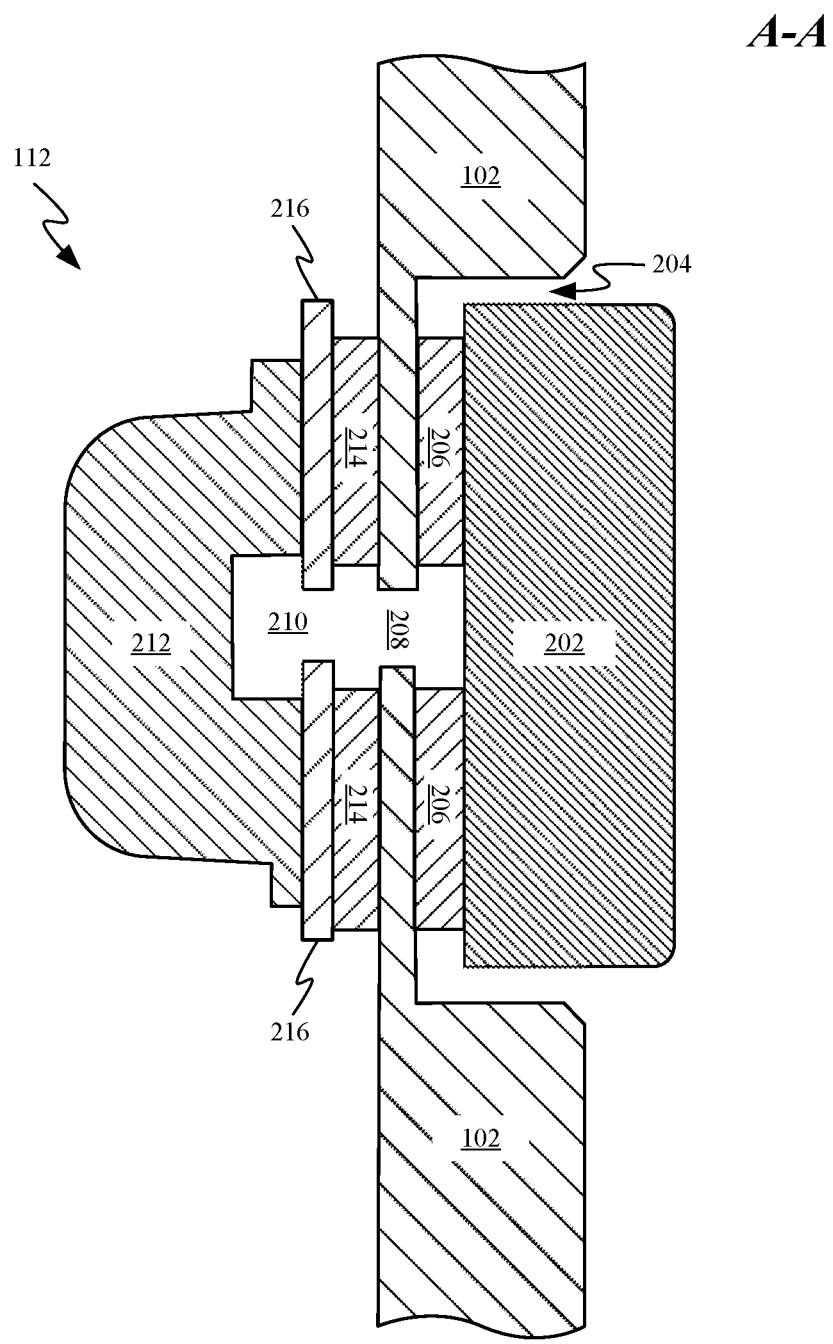
FIG. 2 shows a cross-sectional side view of a side button in accordance with section line A-A, depicted in FIG. 1.

FIG. 2 shows a cross-sectional side view of side button 112 in accordance with section line A-A of FIG. 1. Side button 112 includes button cap 202, which is positioned at least partially within recess 204 defined by device housing 102. Button cap 202 can be secured within recess 204 by a first seal 206. First seal 206 can include an adhesive compound that securely attaches button cap 202 to device housing 102. First seal 206 can be formed from a material such as silicone that has a compressibility that accommodates movement of button cap to varying amounts toward device housing 102. First seal 206 can prevent any air from entering into an interior of side button 112 by surrounding opening 208 that leads into sealed volume 210. Sealed volume 210 is also isolated from a majority of an interior volume of device housing 102 by sensor 212, a second seal 214 and printed circuit board 216. In this way, interior volume 210 can extend through opening 208 and be positioned both within and outside of device housing 102. In some embodiments, a portion of button cap 202 can extend through opening 208 so that interior volume 210 is contained entirely within device housing 102. In some embodiments, the portion of button cap 202 extending through opening 208 can take the form of a plug designed to reduce the volume of interior volume 210. When button cap 202 is pressed and moves closer to device housing 102, a size of sealed volume 210 is reduced. Because gas is not able to escape sealed volume 210, the reduction in size proportionally increases the pressure within sealed volume 210. Sensor 212 can be configured to measure the change in pressure within sealed volume 210. In some embodiments, sensor 212 can be configured to send an actuation signal to a processor within device housing 102 when the measured pressure exceeds a predetermined threshold. In some embodiments, sensor 212 can be configured to send signals in response to detecting multiple different pressure thresholds, thereby allowing side button 219 to vary a response based on different amounts of force being applied to button cap 202. In some embodiments, sensor 212 can be configured to send a raw pressure data to a processor, allowing button 112 to provide a truly analog experience. Such a configuration could be useful in games where fine control is particularly helpful and/or desired. In some embodiments, behavior of side button 112 could vary on an application-by-application basis.

Many different types of sensors could be used to make the aforementioned pressure readings. In some embodiments, sensor 212 can take the form of a microphone. A diaphragm within the microphone could be used to identify pressure changes within sealed volume 210. In some embodiments, the diaphragm can take the form of a flexible silicone substrate. Capacitive sensors can be configured to generate different readings based on the amount of deflection of the diaphragm. Steady state changes in diaphragm position can be these capacitance signals could instead of being used to reproduce audio be instead used solely for making pressure readings. Another advantage of the described sensor configuration is the configuration can be implemented without electrical contacts that could be subject to shorting or fatigue.

Figure 3:
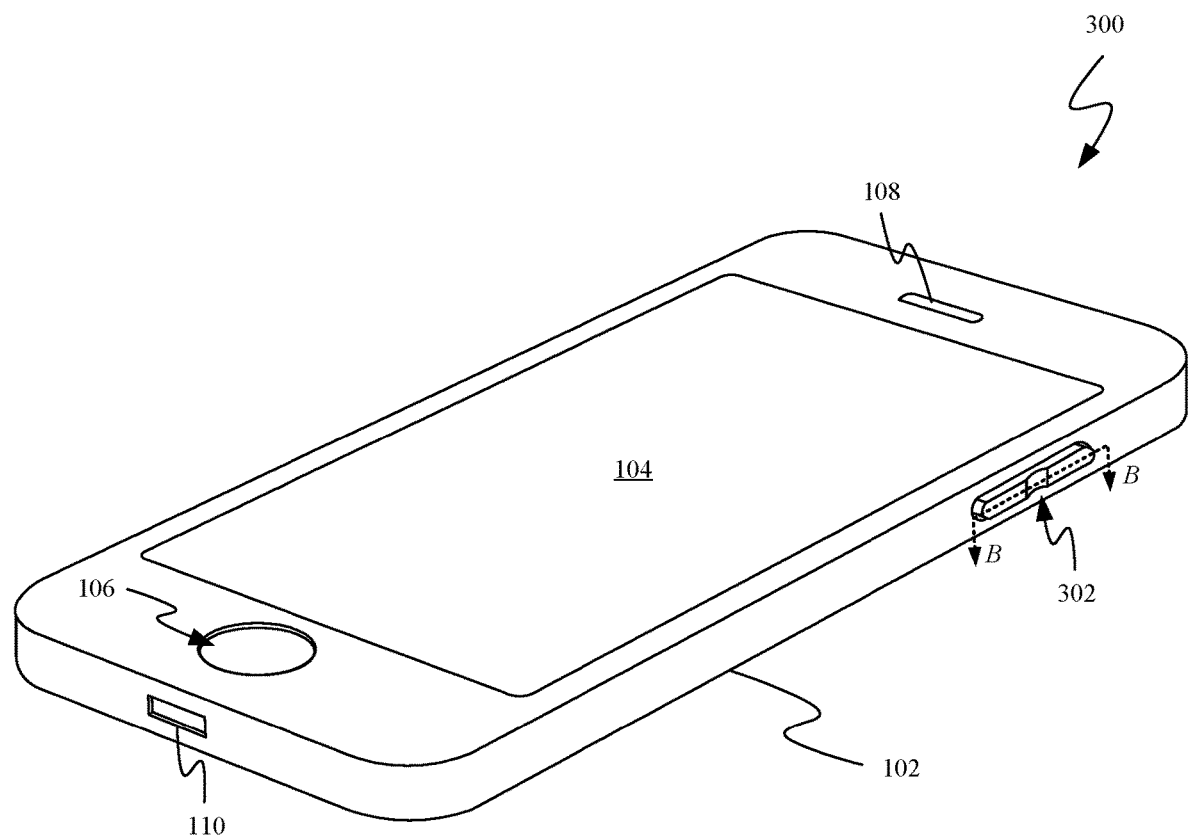
FIG. 3 shows a perspective view of an exemplary portable electronic device suitable for use with the described embodiments.

FIG. 3 shows a perspective view of an exemplary portable electronic device 300 suitable for use with the described embodiments. Portable electronic device 300 includes device housing 102, which houses numerous electrical components that include electronic display 104. Electronic display 104 can be part of a touchscreen display assembly positioned within a front opening defined by sidewalls of device housing 102. Electronic display 104 can be configured to display media content to a user and receive user inputs from a user in the form of touch inputs across the surface of electronic display 104. The electrical components can also include button 106. In some embodiments, portable electronic device 300 can change operating modes in response to button 106 being actuated. Actuating button 106 in rapid succession can cue additional operating modes of portable electronic device 300. Portable electronic device 300 can also include earpiece speaker 108, which is configured to broadcast audio into the ear of a user proximate earpiece speaker 108. In some embodiments, earpiece speaker 108 can be configured to act as a speakerphone to allow the user to carry on a conversation without holding portable electronic device 300 up to an ear. Portable electronic device 300 also includes I/O port 110, which can be configured to receive and transmit data as well as provide a conduit for charging portable electronic device 300. Rocker button 302 can take the form of a push button that can be actuated in response to receiving a predetermined amount of force. In some embodiments, opposing ends of rocker button 302 can be configured to receive volume up and volume down inputs. Pushing on a central portion of rocker button 302 could allow the user to enter a third type of input. For example, pressing the center of rocker button could allow the user to turn portable electronic device 300 on or off depending on a current state of portable electronic device 300.

Figure 4A:
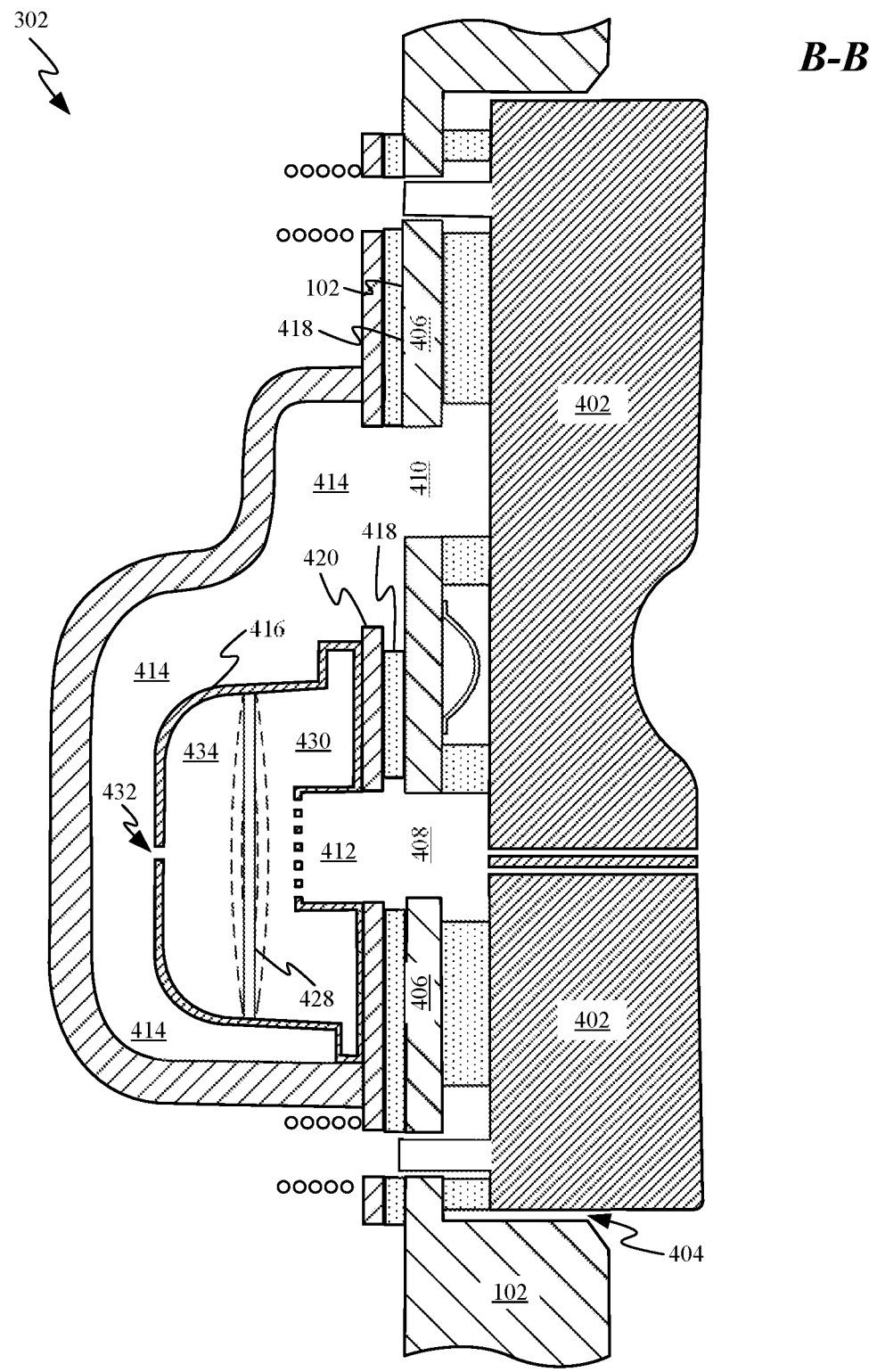
FIG. 4A shows a cross-sectional view of a rocker button in accordance with section line B-B, depicted in FIG. 3.

FIG. 4A shows a cross-sectional view of rocker button 302 in accordance with section line B-B, depicted in FIG. 3. Rocker button 302 includes button cap 402, which is positioned at least partially within recess 404 defined by device housing 102. Button cap 402 can be secured within recess 204 by a first seal 406. First seal 406 can include an adhesive compound that securely attaches button cap 402 to device housing 102. First seal 406 can be formed from a material such as silicone that has a compressibility that accommodates movement of button cap to varying amounts toward device housing 102. First seal 406 can prevent any air from entering into an interior of rocker button 302 by surrounding openings 408 and 410 defined by device housing 102 that lead into sealed volumes 412 and 414. Sealed volume 412 is isolated from a majority of an interior volume of device housing 102 by sensor 416, a second seal 418 and printed circuit board 420.

Figure 4B:
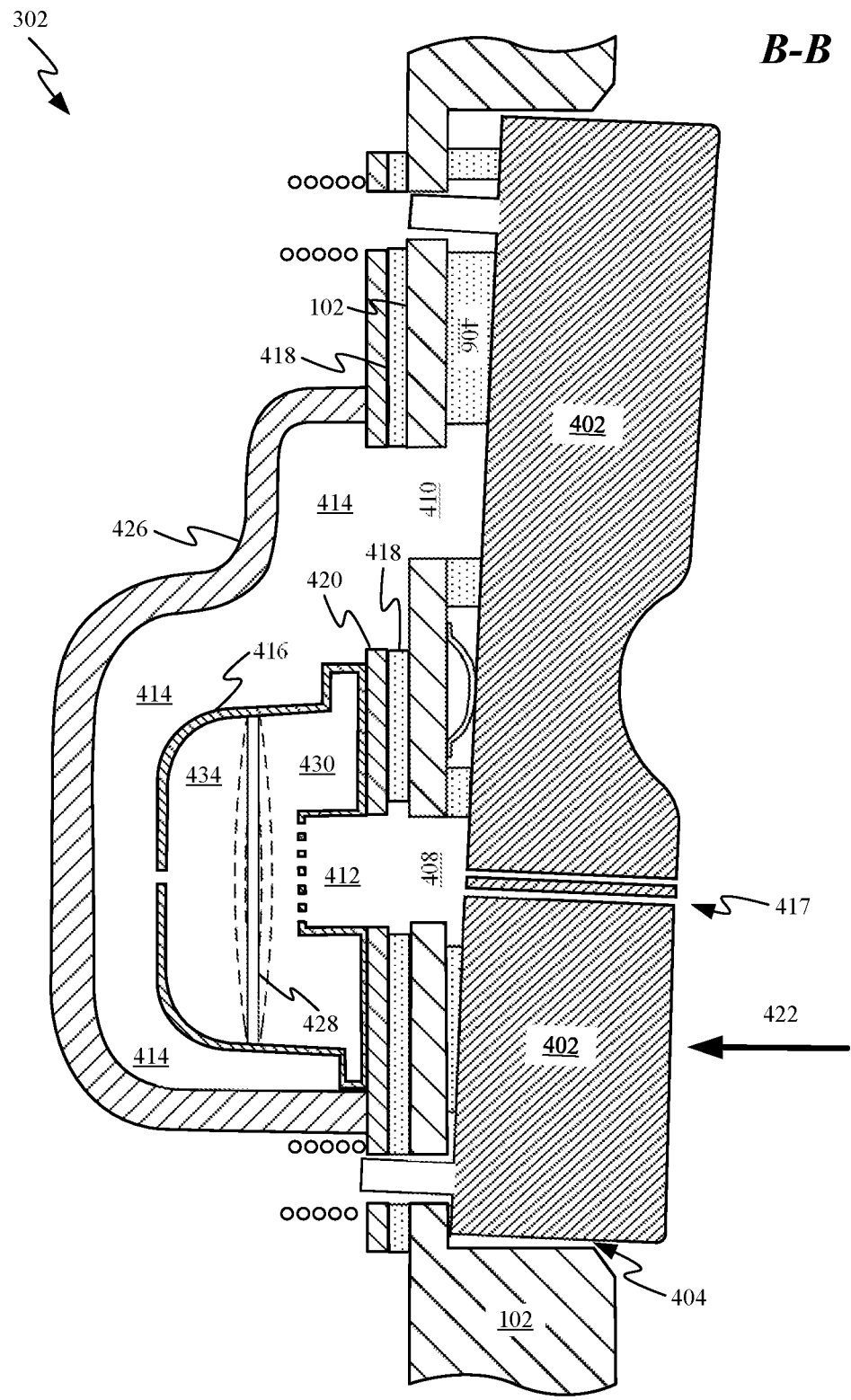
FIG. 4B shows how when a force is applied to a button cap, resulting in a first end of the button cap moving closer to a device housing, a size of a sealed volume associated with the input control is reduced.

FIG. 4B shows how when a force 422 is applied to button cap 402, resulting in a first end of button cap 402 moving closer to device housing 102, a size of sealed volume 412 is reduced. Because gas is not able to escape sealed volume 412, the reduction in size of sealed volume 412 proportionally increases the pressure within sealed volume 412. Sensor 416 can be configured to measure the change in pressure within sealed volume 412. In some embodiments, sensor 416 can be configured to send an actuation signal to a processor within device housing 102 when the measured pressure within sealed volume 412 exceeds a predetermined threshold.

In some embodiments, sensor 416 can take the form of a microphone that in addition to identifying pressure changes can also be used to monitor sound waves. By including one or more narrow openings 417 in button cap 402, the microphone can also characterize audio waves passing therethrough. Because openings 417 are narrow in comparison with sealed volume 412, openings 417 only allow slow equalization of pressure within sealed volume 412. Consequently, in such a configuration, sensor 416 is still able to identify transient actuations of button cap 402 regardless of the small openings leading into sealed volume 412. Sensor 416 can also be used in conjunction with other microphones associated with portable electronic device 300. For example, audio waves sensed by sensor 416 can be used in conjunction with sensor readings from the other microphones to identify a direction of a source of the audio waves using techniques such as time difference of arrival.

Figure 4C:
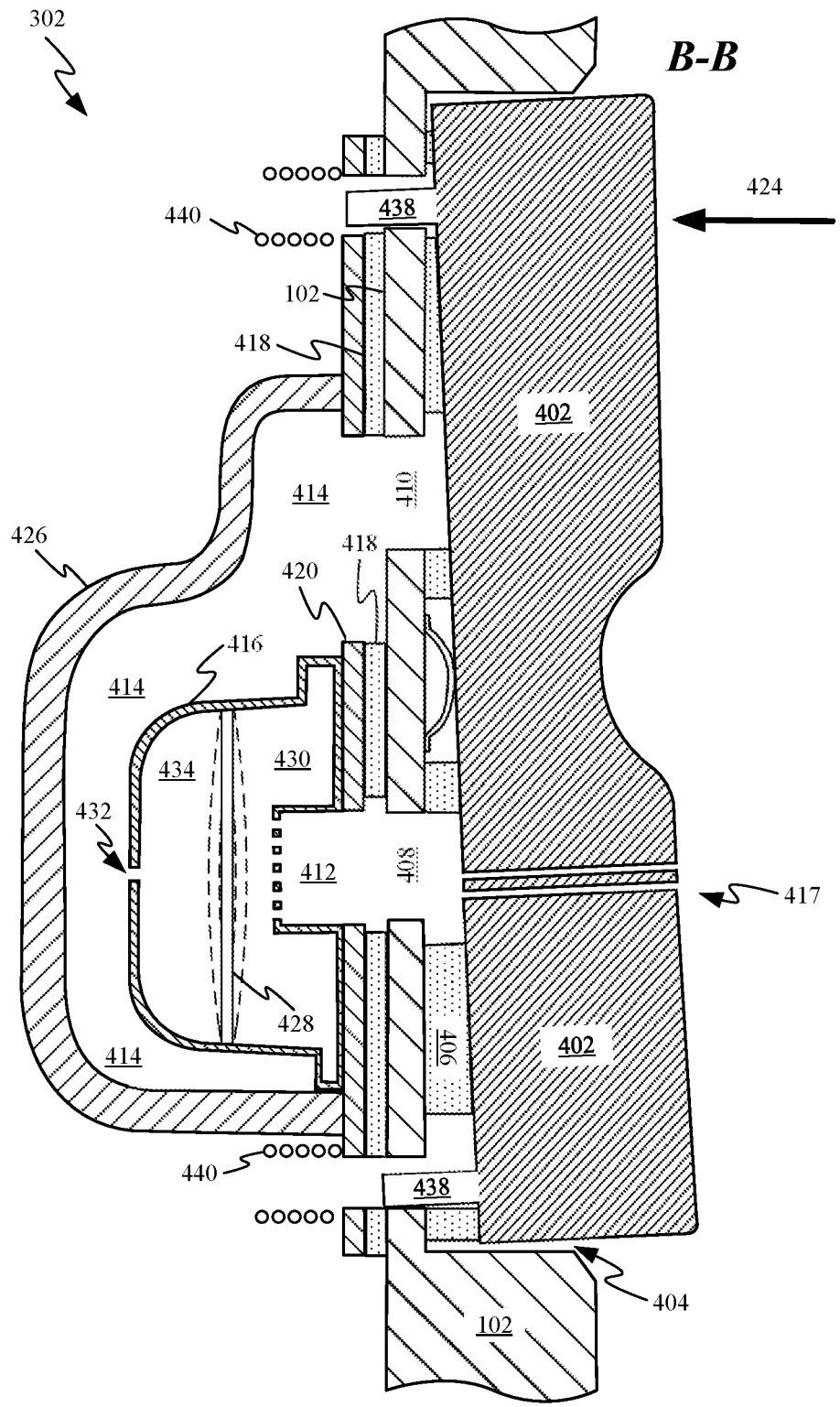
FIG. 4C shows how a force can be applied to a second end of the button cap.

FIG. 4C shows how force 424 can be applied to button cap 402. When force 424 is applied in the depicted location, a second end opposite the first end of button cap 402 moves closer to device housing 102 and a size of sealed volume 414 is reduced, resulting in a pressure increase within sealed volume 414. Sealed volume 414 is defined primarily by button bracket 426, which seals to an interior-facing surface of device housing 102 with second seal 418. In addition to measuring the pressure within sealed volume 412, sensor 416 can also be configured to measure pressure within sealed volume 414. In some embodiments, this is accomplished with a diaphragm 428 of sensor 416. Since air within sealed volume 414 extends into a first region 430 of sensor 416 through rear vent 432 and air within sealed volume 412 extends into second region 434 of sensor 416, movement of diaphragm can be used to determine a pressure differential indicating which sealed volume is more highly pressurized. In this way, a processor receiving signals from sensor 416 could be configured to determine which portion of button cap 402 was being pressed based on the sensed pressure differential. The movement of diaphragm 428 can be sensed by capacitive sensors associated with diaphragm 428. The capacitive sensors can generate a different amount of voltage based on the amount of deflection of diaphragm 428. In some embodiments, different pressure differential thresholds can be associated with different user inputs, thereby allowing the input to be changed based on the amount of force being applied to one or both sides of button cap 402. For example, pressing the portion of button cap 402 generally associated with volume down with a particularly strong force could prompt the volume to be immediately muted. In some embodiments, sensor 416 can be configured to send signals in response to detecting multiple different pressure thresholds, thereby allowing rocker button 302 to vary a response based on different amounts of force being applied to button cap 202. In some embodiments, sensor 416 can be configured to send raw pressure data to a processor, allowing rocker button 302 to provide a truly analog experience. Such a configuration could be useful in games where fine control is particularly helpful and/or desired. In some embodiments, behavior of rocker button 302 could vary on an application-by-application basis.

FIG. 4C also shows how rocker button 302 can also include haptic actuators for providing haptic feedback to a user. In particular, magnetic elements 438 can be adhered to or insert-molded to a rear-facing surface of button cap 402. Magnetic elements 438 can interact with a magnetic field generated by coils 440, when feedback is desired. For example, when a user presses button top 402 with sufficient force to reach a first pressure threshold one of coils 440 can receive electrical current, which generates a magnetic field that interacts with a corresponding one of magnetic elements 438. The resulting magnetic field can create a response force that could be sensed by a user. Because rocker button 302 includes two haptic actuators a variety of feedback responses can be achieved. In particular, this allows a particular region of button cap 402 to be targeted. In some embodiments, the haptic actuators can be alternated to effect a rocking motion of button cap 402. Such an effect could be desired in gaming environment to simulate a particular event.

Figure 4D:
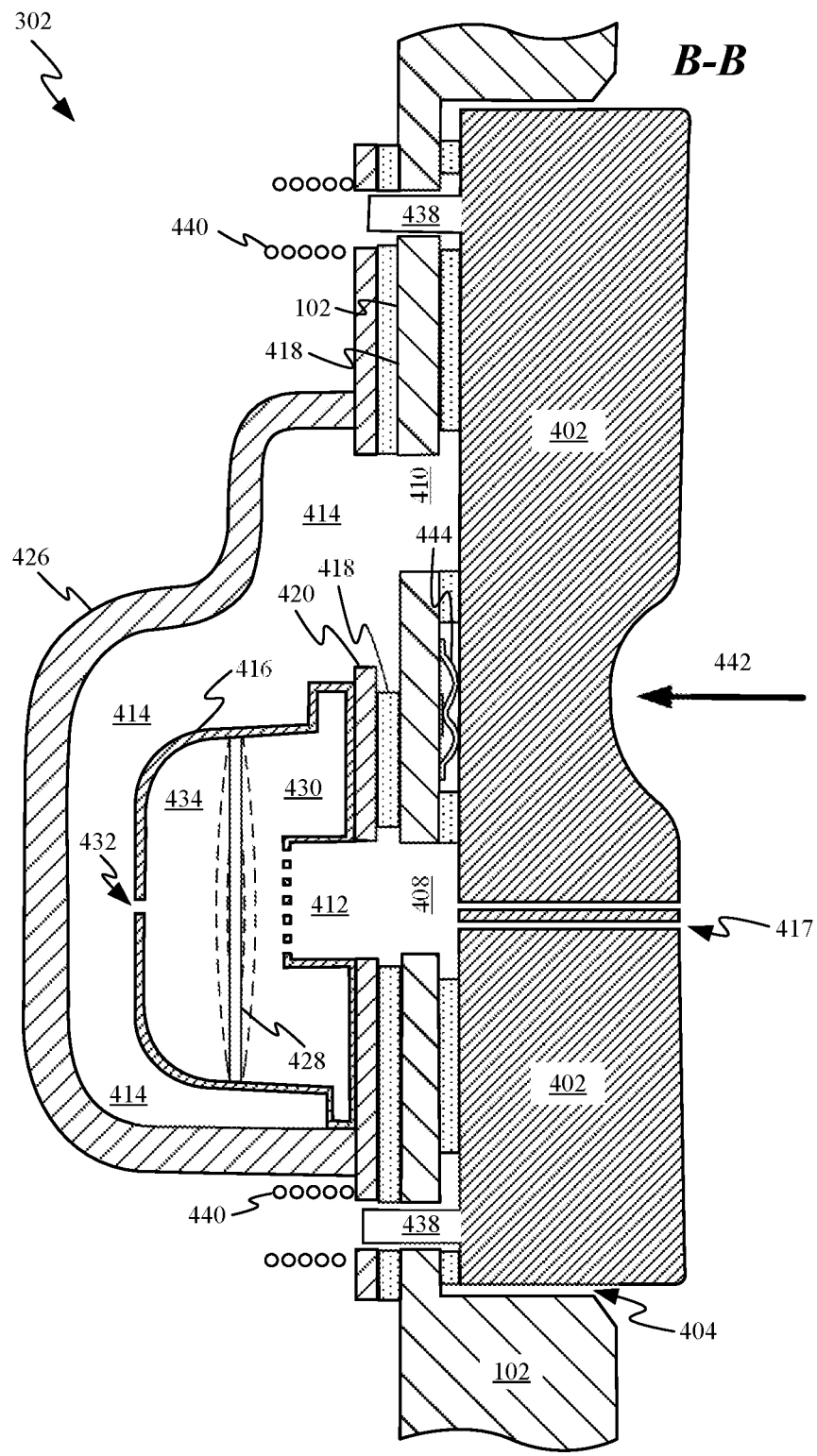
FIG. 4D shows how a force applied to a central region of the button cap can move button cap without rotating it.

FIG. 4D shows how a force 442 applied to a central region of button cap 402 can move button cap 402 without rotating it one way or the other. This type of input has two results. First pressure increases in both sealed volume 412 and sealed volume 414. In response to both pressures increasing, portable electronic device 300 can be configured to provide a varying response based on pressure change as described above. When button cap 402 is pressed firmly enough to engage dome switch 444, as depicted, a different or additional response can be provided. The tactile response of dome switch 444 can also alert a user to button cap 402 being full depressed. In some embodiments, the tactile response provided by dome switch 444 can be augmented by the haptic actuators arranged on opposing sides of button cap 402.

It should be noted that the interior of sensor 416 is provided for exemplary purposes only and a person with ordinary skill in the art would appreciate that other supporting components and structures in addition to diaphragm 428 would be included to make sensor 416 fully functional. Furthermore, in some embodiments, rocker button 302 could include two separate sensors for measuring pressure in sealed volumes 412 and 414. For example, sensor 416 could include two diaphragms with separate volumes able to make precise pressure measurements.

Figure 5:
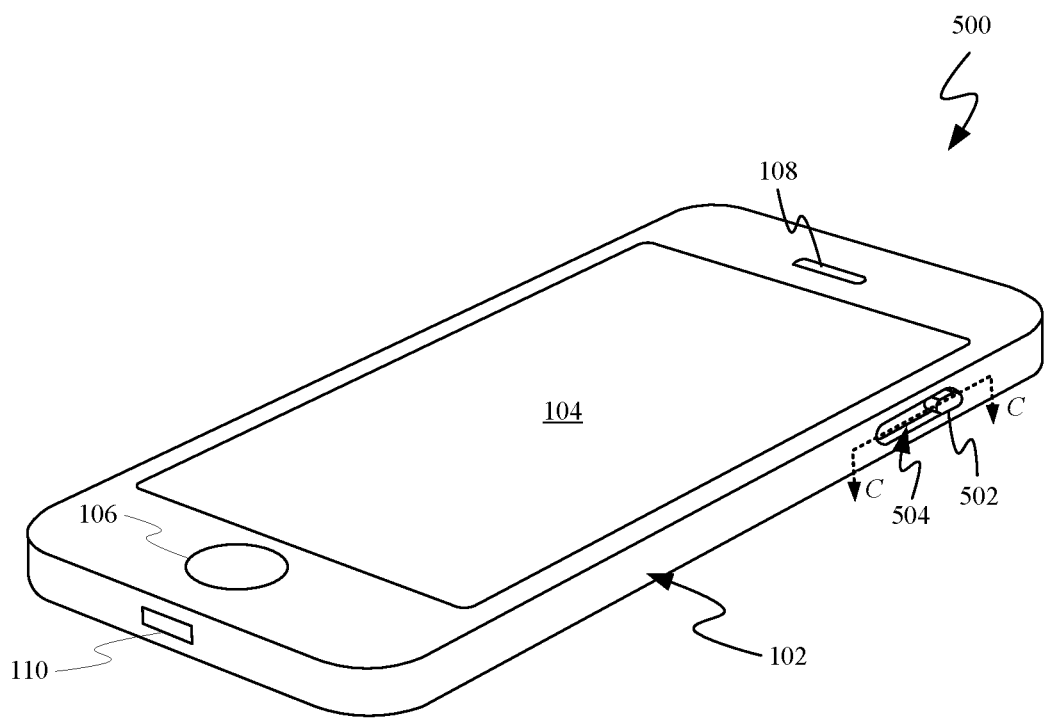
FIG. 5 shows a perspective view of an exemplary portable electronic device suitable for use with the described embodiments.

FIG. 5 shows a perspective view of an exemplary portable electronic device 500 suitable for use with the described embodiments. Portable electronic device 500 includes device housing 102, which houses numerous electrical components that include electronic display 104. Electronic display 104 can be configured to display media content to a user and receive user inputs from a user in the form of touch inputs across the surface of electronic display 104. The electrical components can also include button 106. In some embodiments, portable electronic device 500 can change operating modes in response to button 106 being actuated. Actuating button 106 in rapid succession can cue additional operating modes of portable electronic device 500. Portable electronic device 500 can also include earpiece speaker 108, which is configured to broadcast audio into the ear of a user proximate earpiece speaker 108. In some embodiments, earpiece speaker 108 can be configured to act as a speakerphone to allow the user to carry on a conversation without holding portable electronic device 500 up to an ear. Portable electronic device 500 also includes I/O port 110, which can be configured to receive and transmit data as well as provide a conduit for charging portable electronic device 500. Slider switch 502 is positioned along a sidewall of device housing 102 and can be actuated in response to sliding slider switch 502 laterally a predetermined distance within track 504. In some embodiments, opposing ends of slider switch 502 can correspond to maximum and minimum volume settings. In such a configuration, any other type of input might not be necessary given the intuitive nature of volume corresponding to different positions of slider switch. However, in embodiments where slider switch 502 can correspond to selecting other types of values, configuring slider switch 502 to identify speed of motion of slider switch 502 can also be helpful. For example, quickly sliding slider switch 502 from one end to another could have a very different outcome than sliding it slowly from one end to another. Furthermore, an additional input type can be added to this type of button by allowing slider switch 502 to be pushed inwardly. For example, pressing the slider switch inwardly could allow the user to turn portable electronic device 500 on or off depending on a current state of portable electronic device 500. In some embodiments, inward pressure could transition slider switch 502 between recessed and proud positions relative to an exterior surface of device housing 102.

Figure 6A:
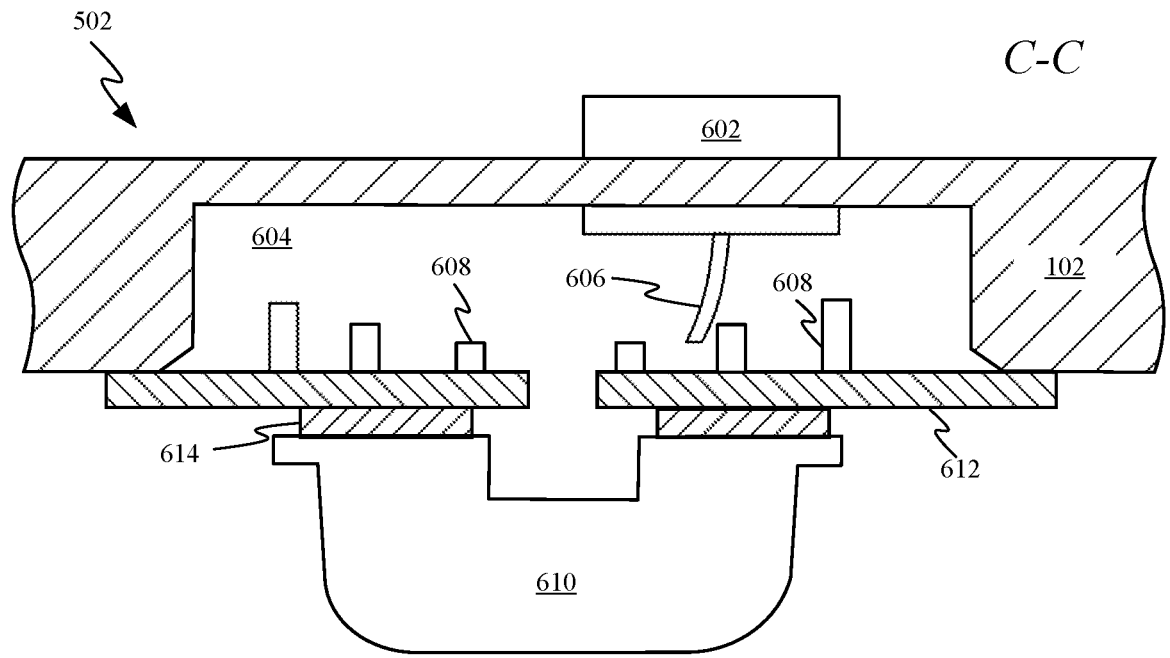
FIGS. 6A-6C show cross-sectional and perspective views associated with the slider switch depicted in FIG. 5.
Figure 6B:
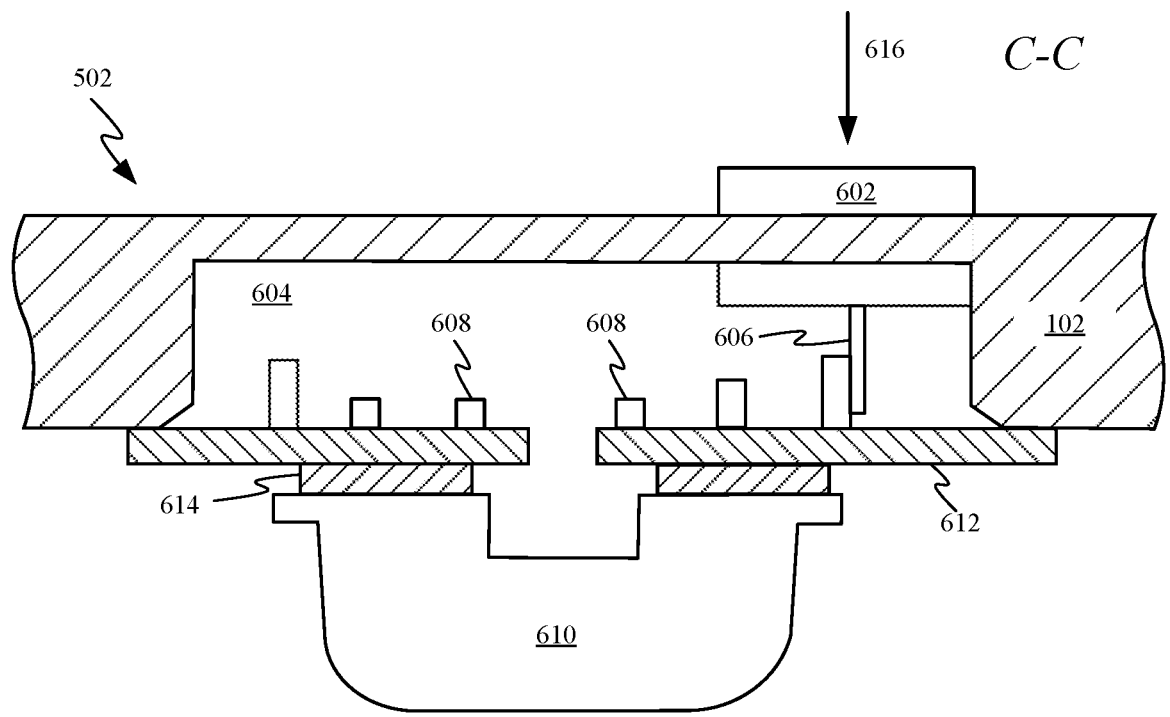
Figure 6C:
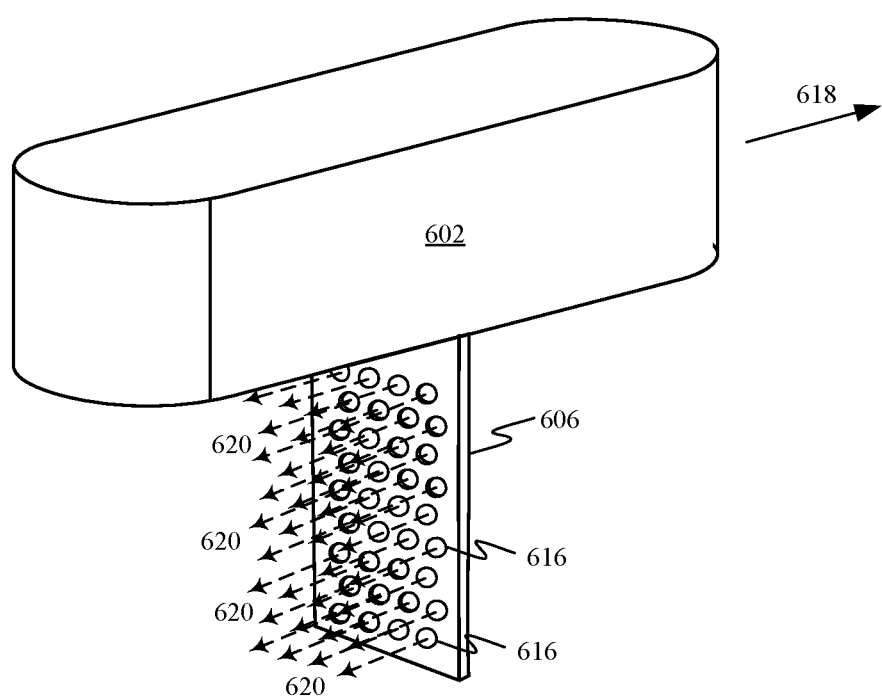

FIGS. 6A-6C show cross-sectional and perspective views associated with slider switch 502 as depicted in FIG. 5. FIG. 6A shows a cross-sectional side view of switch cap 602 arranged within track 504 defined by device housing 102 and extending into a sealed volume 604 defined by device housing 102 in accordance with section line C-C. Slider switch 502 includes a reed 606 suspended from switch cap 602. Reed 606 can be a thin and/or elastic sheet of metal formed from, e.g., NITINOL (i.e. a Nickel Titanium alloy). Consequently, reed 606 is able to bend and flex as it passes over detents 608. In some embodiments, detents 608 can have different heights. The different heights change the amount of resistance to movement as switch cap 602 slides along track 504, allowing a user to get tactile feedback as to the current position of switch cap 602 relative to sealed volume 604. The different heights also change an amount of motion resulting from reed 606 passing over detents 608. Sensor 610 can take the form of a microphone able to detect audio waves generated by the motion of reed 606 as it passes over detents 608. In some embodiments, sensor 610 can be affixed to printed circuit board 612 by seal 614. The differences in audio waves generated by the different height detents 608 can be detected by sensor 610 allowing a determination to be made regarding where on track 504 switch cap 602 is located. Furthermore, a rate at which sound waves are generated by reed 606 passing over detents 608 and received by sensor 610 can help sensor 610 determine a speed at which switch cap 602 is sliding across the track.

FIG. 6B shows switch cap 602 at one end of track 504 and how switch cap 602 can be pushed farther into sealed volume 604. Force 616 can be applied to push switch cap 602 farther into sealed volume 604, as depicted, which reduces the total volume of sealed volume 604. In this way, a steady state pressure within sealed volume 604 can be increased. Switch cap 602 can include a sliding seal assembly that allow switch cap 602 to be pushed farther into sealed volume 604 without opening sealed volume 604 to the ambient environment. In some embodiments, switch cap 602 can include a spring assembly that helps transition switch cap 602 between recessed and proud positions. In everyday use, when a processor is receiving consistently higher pressure readings from sensor 610, these pressure readings can be associate with the switch cap being pushed farther into sealed volume 604. In some embodiments, sensor 610 can be recalibrated when switch cap 602 is pressed farther into sealed volume 604 as reed 606 undergoes more deflection as it passes over detents 608.

FIG. 6C shows a perspective view of a portion of slider switch 502 and in particular switch cap 602 and reed 606. Reed 606 is shown defining multiple perforations 616. When switch cap 602 slides in direction 618, perforations 616 allow air streams 620 to pass through reed 606. Air streams 620 generate audio waves passing through perforations 616. As the speed of switch cap 602 increases so does the strength of the audio waves generated. For this reason, reed 606 can include perforations to give sensor 610 additional details regarding the speed and position of reed 606 within sealed volume 604. In some embodiments, interaction between air streams 607 and perforations 616 of reed 606 can be enough to track the position of switch cap 602 without any detents 608.

Figure 7:
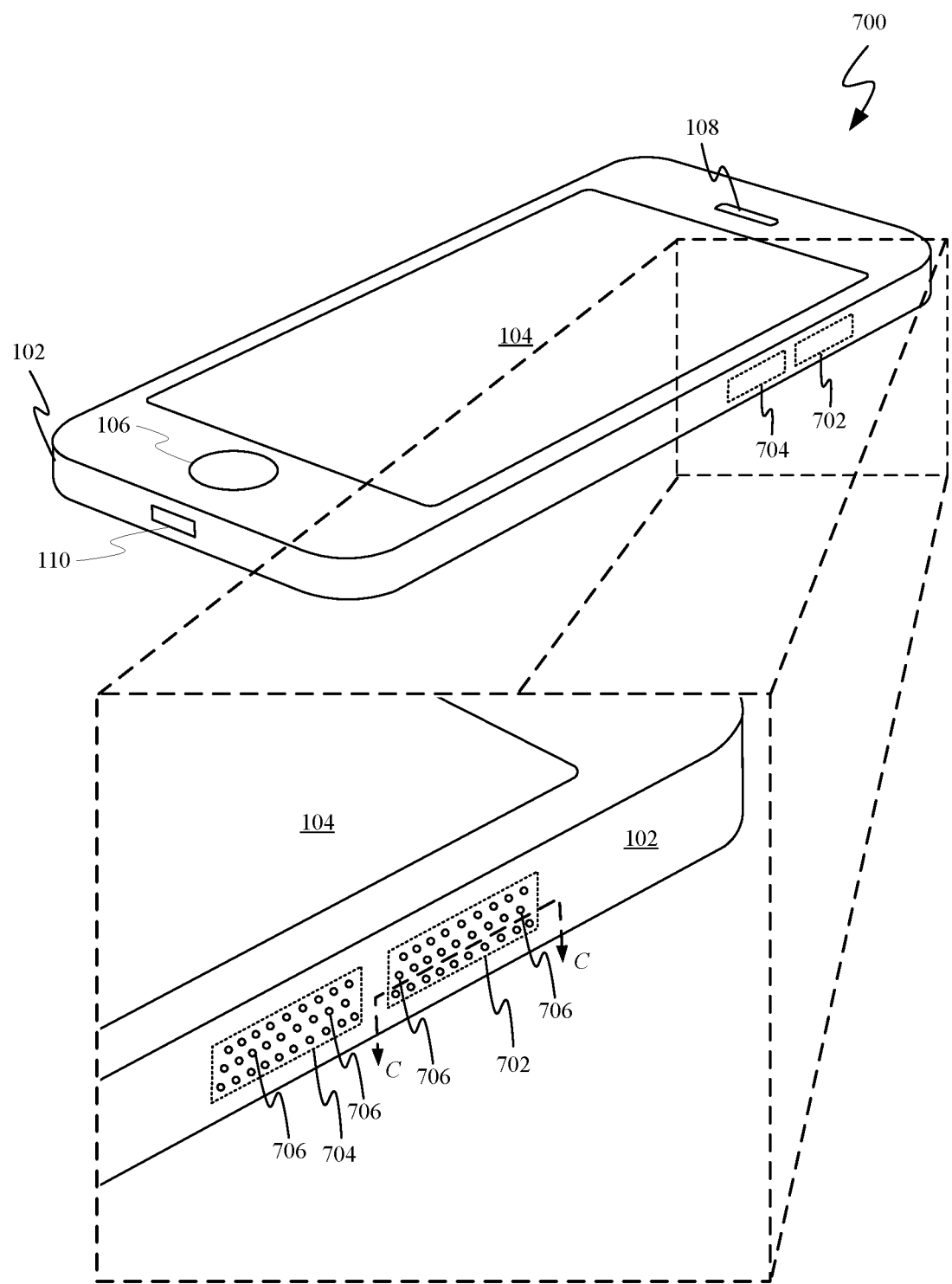
FIG. 7 shows a perspective view of an exemplary portable electronic device suitable for use with the described embodiments.

FIG. 7 shows a perspective view of an exemplary portable electronic device 700 suitable for use with the described embodiments. Portable electronic device 700 includes device housing 102, which houses numerous electrical components that include electronic display 104. Electronic display 104 can be configured to display media content to a user and receive user inputs from a user in the form of touch inputs across the surface of electronic display 104. The electrical components can also include button 106. In some embodiments, portable electronic device 700 can change operating modes in response to button 106 being actuated. Actuating button 106 in rapid succession can cue additional operating modes of portable electronic device 700. Portable electronic device 700 can also include earpiece speaker 108, which is configured to broadcast audio into the ear of a user proximate earpiece speaker 108. In some embodiments, earpiece speaker 108 can be configured to act as a speakerphone to allow the user to carry on a conversation without holding portable electronic device 700 up to an ear. Portable electronic device 700 also includes I/O port 110, which can be configured to receive and transmit data as well as provide a conduit for charging portable electronic device 700. Portable electronic device 700 can include multiple input regions 702 and 704. In some embodiments, additional input regions can be included.

Input region 702 can be actuated in response to receiving a threshold amount of pressure that elastically deforms a portion of a sidewall of device housing 102 associated with input region 702. In some embodiments, input regions 702 and 704 can be perforated to allow the input regions to be illuminated. This can be advantageous in alerting a user to a special function or even to the existence of one or more of the input regions. For example, in some embodiments, input region could be illuminated any time it is enabled. In some embodiments, the input regions could be illuminated to indicate a special operating mode. It should be noted that while only two input regions are indicated, any number of input regions could be distributed around the exterior of device housing 102. Furthermore, instead of or in addition to illuminate input regions, each of input regions can be identified by laser-etched shapes indicating the position of each of the input regions. Other possible indicia include painted or anodized markings indicating the input region positions.

Figure 8A:
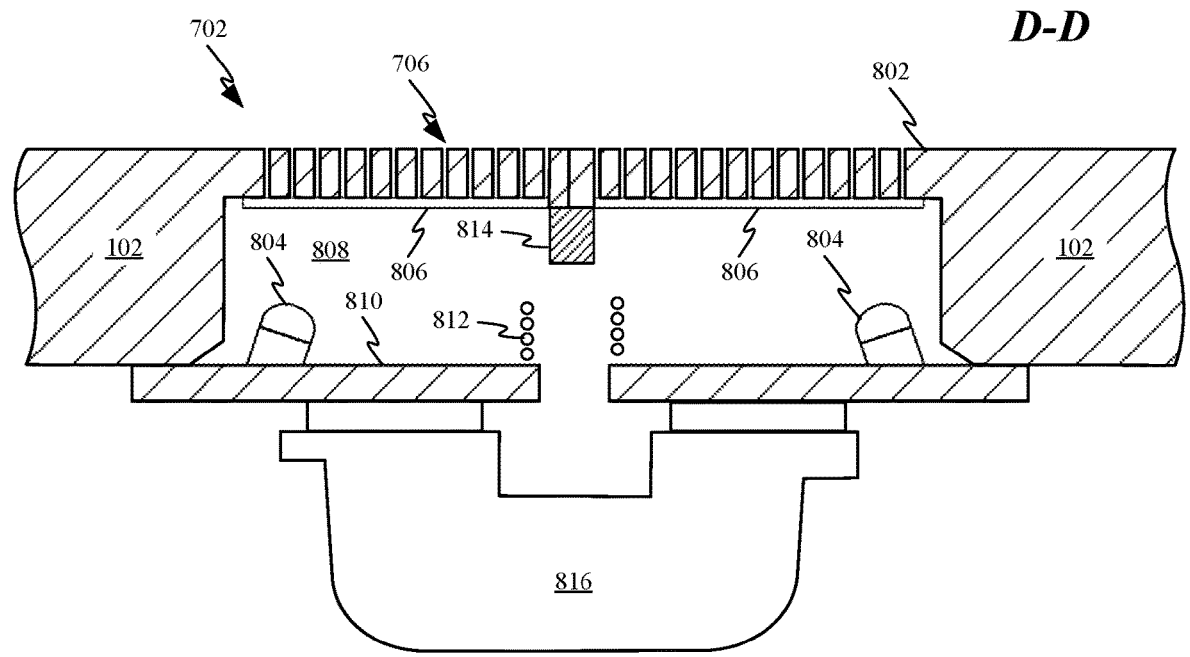
FIGS. 8A-8B show cross-sectional side view of the portable electronic device depicted in FIG. 7 in accordance with section line D-D.
Figure 8B:
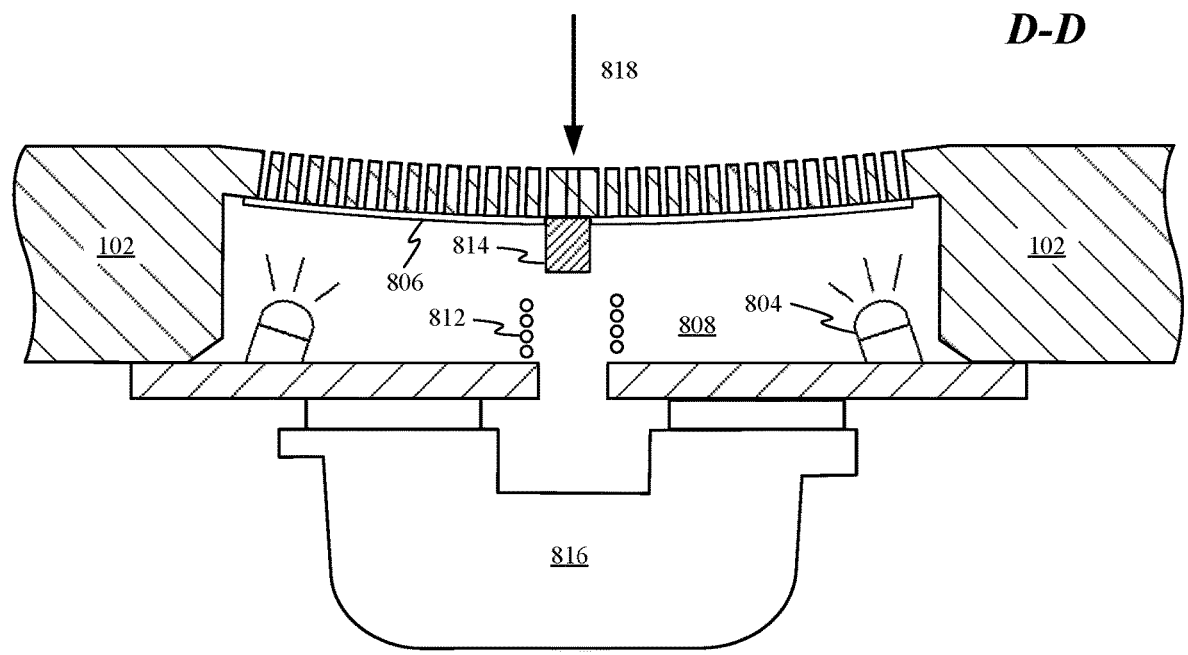

FIGS. 8A-8B show cross-sectional side view of portable electronic device 700 in accordance with section line D-D as depicted in FIG. 7. As depicted in FIG. 8A, device housing 102 includes a thinned wall region 802 that corresponds to input region 702. In some embodiments, thinned wall region 802 can define multiple perforations 706 through which light emitted by one or more of light sources 804 can exit device housing 102. In some embodiments, a protective layer 806 can be adhered to an inward-facing surface of thinned wall region 802. The protective layer 806 can be optically transparent to allow light emitted by light sources 804 to exit device housing 102, while maintaining a sealed volume 808. In some embodiments, protective layer 806 can leave one or more of perforations 706 exposed to allow audio waves to enter sealed volume 808. In some embodiments, protective layer can be configured to vibrate in order to pass audio waves through protective layer 806 and into sealed volume 808. Light sources 804 can be surface mounted to printed circuit board 810. Input region 702 can also have an associated haptic actuator that includes coil 812, which can also be surface mounted to printed circuit board 810. Coil 812 is configured to emit a magnetic field that interacts with magnetic element 814 to provide vibratory haptic feedback to a user of input region 702 of portable electronic device 700. Sensor is configured to monitor a pressure within sealed volume 808 in order to identify actuation of input region 702 by a user.

FIG. 8B shows how a force 818 can be applied to input region 702, causing thinned wall region 802 to deform inwardly. The inward deformation increases pressure within sealed volume 808 sufficient to trigger sensor 816, which can take the form of a pressure sensor capable of identifying the pressure change, to send a signal to a processor for further actions consistent with the actuation of input region 702. FIG. 8B also shows how light sources 804 can illuminate input region 702 in response to a received user input. Alternatively, or additionally, coil 812 can be energized to create a vibratory feedback to applied force 818.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A portable electronic device, comprising:
a device housing comprising a housing wall defining an opening extending therethrough;
an input control coupled to an exterior-facing surface of the housing wall and disposed over a first end of the opening, the input control being configured to receive a user input; and a pressure sensor coupled to an interior-facing surface of the housing wall and covering a second end of the opening such that the input control and pressure sensor cooperatively enclose an interior volume, the pressure sensor being configured to characterize a pressure change within the interior volume resulting from movement of the input control.

2. The portable electronic device as recited in claim 1, wherein the pressure sensor is a microphone.

3. The portable electronic device as recited in claim 1, wherein the interior volume is a sealed volume.

4. The portable electronic device as recited in claim 1, further comprising a processor in communication with the pressure sensor, wherein the processor determines when the pressure change within the interior volume exceeds a predetermined threshold, the predetermined threshold corresponding to a user input.

5. The portable electronic device as recited in claim 4, wherein the pressure change exceeding a first threshold corresponds to a first user input and the pressure change exceeding a second threshold corresponds to a second user input different than the first user input.

6. The portable electronic device as recited in claim 1, wherein the input control is a button.

7. The portable electronic device as recited in claim 1, wherein the input control is a rocker button.

8. The portable electronic device as recited in claim 7, wherein the opening is a first opening and the interior volume is a first interior volume, wherein the first interior volume is disposed between a first side of the pressure sensor and a first end of the rocker button, wherein the housing wall defines a second opening and a second end of the rocker button is disposed over a first end of the second opening, and wherein a second interior volume is disposed between a second side of the pressure sensor and the second end of the rocker button.

9. The portable electronic device as recited in claim 8, wherein the pressure sensor is configured to identify a differential pressure of the first interior volume relative to the second interior volume.

10. The portable electronic device as recited in claim 1, further comprising a haptic actuator configured to provide vibratory feedback in response to a pressure change corresponding to a user input.

11. A portable electronic device, comprising:
a device housing comprising sidewalls that cooperatively define a front opening, one of the sidewalls defining a side opening extending therethrough;
a touch screen display assembly disposed within the front opening;
an input control positioned at least partially within a recess defined by an exterior-facing surface of the sidewall defining the side opening, the input control disposed over a first end of the side opening; and
a pressure sensor coupled to an interior-facing surface of the sidewall and covering a second end of the side opening such that the input control and the pressure sensor cooperatively enclose an interior volume, the pressure sensor being configured to characterize user inputs received by the input control by monitoring pressure changes within the interior volume resulting from a movement of the input control.

12. The portable electronic device as recited in claim 11, wherein the pressure sensor is a microphone.

13. The portable electronic device as recited in claim 12, wherein the input control defines one or more openings that allow audio waves generated outside the portable electronic device to enter the interior volume, and wherein the microphone is configured to characterize audio waves entering the interior volume.

14. The portable electronic device as recited in claim 11, further comprising a magnetic element coupled to the input control.

15. The portable electronic device as recited in claim 14, further comprising a coil configured to generate a magnetic field that interacts with the magnetic element to vibrate the portable electronic device.

16. The portable electronic device as recited in claim 15, wherein an amount of vibration generated by the coil increases in accordance with the movement of the input control.

17. A portable electronic device, comprising:
a device housing comprising a housing wall defining a first opening and a second opening extending therethrough;
an input control coupled to an exterior-facing surface of the housing wall and disposed over a first end of the first opening and a first end of the second opening, the input control being configured to receive a user input;
a pressure sensor coupled to an interior-facing surface of the housing wall and covering a second end of the first opening such that the input control and the pressure sensor cooperatively enclose a first interior volume; and
a bracket coupled to the interior-facing surface and enclosing a second interior volume, the pressure sensor being configured to characterize pressure changes within both the first interior volume and the second interior volume resulting from movement of the input control.

18. The portable electronic device as recited in claim 17, wherein the pressure sensor is configured to identify a differential pressure of the first interior volume relative to the second interior volume.

19. The portable electronic device as recited in claim 17, wherein the pressure sensor is a microphone having a diaphragm.

20. The portable electronic device as recited in claim 19, wherein a first end of the microphone includes one or more openings in fluid communication with the first interior volume and a first side of the diaphragm and wherein a second end of the microphone includes an opening in fluid communication with the second interior volume and a second side of the diaphragm.

* * * * *